(12) United States Patent
Dugan

(10) Patent No.: US 10,434,422 B2
(45) Date of Patent: Oct. 8, 2019

(54) SYSTEMS AND METHODS FOR FITNESS AND VIDEO GAMES

(71) Applicant: Brian M. Dugan, Sleepy Hollow, NY (US)

(72) Inventor: Brian M. Dugan, Sleepy Hollow, NY (US)

( * ) Notice: Subject to any disclaimer, the term of this patent is extended or adjusted under 35 U.S.C. 154(b) by 0 days.

(21) Appl. No.: 15/854,740

(22) Filed: Dec. 26, 2017

(65) Prior Publication Data

US 2018/0117475 A1    May 3, 2018

Related U.S. Application Data

(63) Continuation of application No. 15/159,664, filed on May 19, 2016, now Pat. No. 9,873,054, which is a continuation of application No. 13/440,987, filed on Apr. 5, 2012, now Pat. No. 9,610,506, which is a continuation-in-part of application No. 13/433,285, filed on Mar. 28, 2012, now Pat. No. 9,533,228.

(Continued)

(51) Int. Cl.
| | |
|---|---|
| *A63F 13/00* | (2014.01) |
| *A63F 13/816* | (2014.01) |
| *A63F 13/216* | (2014.01) |
| *A63F 13/31* | (2014.01) |

(52) U.S. Cl.
CPC .......... *A63F 13/816* (2014.09); *A63F 13/216* (2014.09); *A63F 13/31* (2014.09); *A63F 2300/204* (2013.01); *A63F 2300/5573* (2013.01); *A63F 2300/8005* (2013.01)

(58) Field of Classification Search
CPC .. G06F 19/3481; A63F 13/00; A63B 24/0021; A63B 24/00
See application file for complete search history.

(56) References Cited

U.S. PATENT DOCUMENTS

| | | |
|---|---|---|
| 3,834,702 A | 9/1974 | Bliss |
| 4,484,743 A | 11/1984 | Williams |

(Continued)

FOREIGN PATENT DOCUMENTS

| | | |
|---|---|---|
| EP | 1 292 217 B1 | 11/2005 |
| EP | 1 639 939 | 3/2006 |

(Continued)

OTHER PUBLICATIONS

Busch, Fritz "Diabetes Institute Brings Dakota, New Ulm Together" Jun. 10, 2001. Ogden Newspapers, Inc.

(Continued)

*Primary Examiner* — Reginald A Renwick
(74) *Attorney, Agent, or Firm* — Dugan & Dugan, PC

(57) ABSTRACT

In some aspects, a system is provided that includes a plurality of mobile devices and an application on at least a first mobile device. The application is adapted to track position information regarding the first mobile device, communicate the position information to a web server, receive position information from the web server regarding other mobile devices within a predetermined distance of the first mobile device, and use the position information regarding the other mobile devices to affect one or more characteristics of a video game executed on the first mobile device. Numerous other aspects are provided.

21 Claims, 9 Drawing Sheets

Related U.S. Application Data

(60) Provisional application No. 61/472,191, filed on Apr. 5, 2011, provisional application No. 61/468,444, filed on Mar. 28, 2011.

(56) References Cited

U.S. PATENT DOCUMENTS

| | | |
|---|---|---|
| 4,542,897 A | 9/1985 | Melton et al. |
| 4,735,410 A | 4/1988 | Nobuta |
| 4,817,938 A | 4/1989 | Nakao et al. |
| 4,858,930 A | 8/1989 | Sato |
| 4,976,435 A | 12/1990 | Shatford et al. |
| 5,001,632 A | 3/1991 | Hall-Tipping |
| 5,142,358 A | 8/1992 | Jason |
| 5,213,555 A | 5/1993 | Hood |
| RE34,728 E | 9/1994 | Hall-Tipping |
| 5,362,069 A | 11/1994 | Hall-Tipping |
| 5,377,100 A | 12/1994 | Pope et al. |
| 5,462,504 A | 10/1995 | Trulaske et al. |
| 5,515,865 A | 5/1996 | Scanlon |
| 5,527,239 A | 6/1996 | Abbondanza |
| 5,591,104 A | 1/1997 | Andrus et al. |
| 5,592,401 A | 1/1997 | Kramer |
| 5,616,078 A | 4/1997 | Oh |
| 5,624,316 A | 4/1997 | Roskowski et al. |
| 5,645,513 A | 7/1997 | Haydocy et al. |
| 5,667,459 A | 9/1997 | Su |
| 5,672,107 A | 9/1997 | Clayman |
| 5,702,323 A | 12/1997 | Poulton |
| 5,781,698 A | 7/1998 | Teller et al. |
| 5,885,156 A | 3/1999 | Toyohara et al. |
| 5,902,250 A | 5/1999 | Verrier et al. |
| 5,918,603 A | 7/1999 | Brown |
| 5,928,133 A | 7/1999 | Halyak |
| 5,947,868 A | 9/1999 | Dugan |
| 5,982,352 A | 11/1999 | Pryor |
| 6,024,675 A | 2/2000 | Kashiwaguchi |
| 6,062,216 A | 5/2000 | Corn |
| 6,066,075 A | 5/2000 | Poulton |
| 6,152,856 A | 11/2000 | Studor et al. |
| 6,179,713 B1 | 1/2001 | James et al. |
| D439,981 S | 4/2001 | Kasabach et al. |
| 6,213,872 B1 | 4/2001 | Harada et al. |
| 6,244,988 B1 | 6/2001 | Delman |
| 6,251,010 B1 | 6/2001 | Tajiri et al. |
| 6,267,677 B1 | 7/2001 | Tajiri et al. |
| 6,302,789 B2 | 10/2001 | Harada et al. |
| D451,604 S | 12/2001 | Kasabach et al. |
| 6,347,993 B1 | 2/2002 | Kondo et al. |
| 6,354,940 B1 | 3/2002 | Itou et al. |
| 6,375,572 B1 | 4/2002 | Masuyama et al. |
| D460,971 S | 7/2002 | Sica et al. |
| 6,456,749 B1 | 9/2002 | Kasabach et al. |
| 6,482,092 B1 | 11/2002 | Tajiri et al. |
| 6,494,830 B1 | 12/2002 | Wessel |
| 6,513,160 B2 | 1/2003 | Dureau |
| 6,514,199 B1 | 2/2003 | Alessandri |
| 6,527,711 B1 | 3/2003 | Stivoric et al. |
| 6,579,231 B1 | 6/2003 | Phipps |
| 6,585,622 B1 | 7/2003 | Shum et al. |
| 6,595,858 B1 | 7/2003 | Tajiri et al. |
| 6,595,929 B2 | 7/2003 | Stivoric et al. |
| 6,605,038 B1 | 8/2003 | Teller et al. |
| 6,628,847 B1 | 9/2003 | Kasabach et al. |
| 6,641,482 B2 | 11/2003 | Masuyama et al. |
| 6,652,383 B1 | 11/2003 | Sonoda et al. |
| 6,705,972 B1 | 3/2004 | Takano et al. |
| 6,720,983 B1 | 4/2004 | Massaro et al. |
| 6,746,371 B1 | 6/2004 | Brown et al. |
| 6,758,746 B1 | 7/2004 | Hunter et al. |
| 6,786,825 B2 | 9/2004 | Kawazu |
| 6,796,927 B2 | 9/2004 | Toyama |
| 6,881,176 B2 | 4/2005 | Oishi et al. |
| 6,888,779 B2 | 5/2005 | Mollicone et al. |
| 6,902,513 B1 | 6/2005 | McClure |
| 6,966,837 B1 | 11/2005 | Best |
| 7,020,508 B2 | 3/2006 | Stivoric et al. |
| 7,041,049 B1 | 5/2006 | Raniere |
| 7,057,551 B1 | 6/2006 | Vogt |
| 7,068,860 B2 | 6/2006 | Kasabach et al. |
| 7,153,262 B2 | 12/2006 | Stivoric et al. |
| 7,261,690 B2 | 8/2007 | Teller et al. |
| 7,285,090 B2 | 10/2007 | Stivoric et al. |
| 7,627,139 B2 | 12/2009 | Marks |
| 7,628,730 B1 | 12/2009 | Watterson et al. |
| 7,684,592 B2 | 3/2010 | Paul |
| 7,749,056 B2 | 7/2010 | Ando et al. |
| 7,874,957 B2 | 1/2011 | Hurwitz |
| 7,931,563 B2 | 4/2011 | Shaw et al. |
| 7,934,983 B1 | 5/2011 | Eisner |
| 7,946,959 B2 | 5/2011 | Shum et al. |
| 8,152,531 B1 | 4/2012 | Puopolo |
| 8,188,868 B2 | 5/2012 | Case, Jr. |
| 8,284,157 B2 | 10/2012 | Markovic et al. |
| 8,287,383 B2 | 10/2012 | Etter et al. |
| 8,287,436 B2 | 10/2012 | Shum et al. |
| 8,292,743 B1 | 10/2012 | Etter et al. |
| 8,313,416 B2 | 11/2012 | Ellis et al. |
| 8,444,491 B2 | 5/2013 | Bethke et al. |
| 8,491,395 B2 | 7/2013 | Auterio et al. |
| 8,496,532 B1 | 7/2013 | Bethke et al. |
| 8,506,409 B2 | 8/2013 | Bethke et al. |
| 8,556,778 B1 | 10/2013 | Dugan |
| 8,608,570 B1 | 12/2013 | Mahajan et al. |
| 8,654,198 B2 | 2/2014 | Pryor |
| 8,784,273 B2 | 7/2014 | Dugan |
| 9,162,142 B2 | 10/2015 | Shum |
| 9,177,387 B2 | 11/2015 | Marks |
| 2002/0022516 A1 | 2/2002 | Forden |
| 2002/0080035 A1 | 6/2002 | Youdenko |
| 2002/0082065 A1 | 6/2002 | Fogel et al. |
| 2002/0082077 A1 | 6/2002 | Johnson et al. |
| 2002/0090985 A1 | 7/2002 | Tochner et al. |
| 2002/0151992 A1 | 10/2002 | Hoffberg et al. |
| 2002/0160883 A1 | 10/2002 | Dugan |
| 2002/0163495 A1 | 11/2002 | Doynov |
| 2003/0224855 A1 | 12/2003 | Cunningham |
| 2004/0023761 A1 | 2/2004 | Emery |
| 2004/0053690 A1 | 3/2004 | Fogel et al. |
| 2005/0049022 A1* | 3/2005 | Mullen ............... A63F 13/12 463/1 |
| 2005/0068169 A1 | 3/2005 | Copley et al. |
| 2005/0101845 A1 | 5/2005 | Nihtila |
| 2005/0177051 A1 | 8/2005 | Almen |
| 2005/0275541 A1 | 12/2005 | Sengupta et al. |
| 2006/0025282 A1 | 2/2006 | Redmann |
| 2006/0031102 A1 | 2/2006 | Teller et al. |
| 2006/0089543 A1 | 4/2006 | Kim et al. |
| 2006/0122474 A1 | 6/2006 | Teller et al. |
| 2006/0224051 A1 | 10/2006 | Teller et al. |
| 2006/0264730 A1 | 11/2006 | Stivoric et al. |
| 2006/0281543 A1 | 12/2006 | Sutton et al. |
| 2007/0004482 A1 | 1/2007 | Ando et al. |
| 2007/0038038 A1 | 2/2007 | Stivoric et al. |
| 2007/0053513 A1 | 3/2007 | Hoffberg |
| 2007/0087828 A1* | 4/2007 | Robertson ........... A63F 13/12 463/42 |
| 2007/0111858 A1 | 5/2007 | Dugan |
| 2007/0167204 A1 | 7/2007 | Lyle et al. |
| 2007/0173705 A1 | 7/2007 | Teller et al. |
| 2007/0197274 A1 | 8/2007 | Dugan |
| 2007/0208233 A1 | 9/2007 | Kovacs |
| 2007/0239479 A1 | 10/2007 | Arrasvuori |
| 2007/0260482 A1 | 11/2007 | Nurmela et al. |
| 2008/0027337 A1 | 1/2008 | Dugan et al. |
| 2008/0094226 A1 | 4/2008 | O'Shea et al. |
| 2008/0129518 A1 | 6/2008 | Carlton-Foss |
| 2008/0146892 A1 | 6/2008 | LeBoeuf et al. |
| 2008/0158232 A1 | 7/2008 | Shuster |
| 2008/0167861 A1 | 7/2008 | Inoue et al. |
| 2008/0191864 A1 | 8/2008 | Wolfson |
| 2008/0218310 A1 | 9/2008 | Alten et al. |
| 2008/0281633 A1 | 11/2008 | Burdea et al. |
| 2008/0318679 A1 | 12/2008 | Tran et al. |

(56) References Cited

U.S. PATENT DOCUMENTS

| | | |
|---|---|---|
| 2009/0005140 A1 | 1/2009 | Rose et al. |
| 2009/0121894 A1 | 5/2009 | Wilson et al. |
| 2009/0221338 A1 | 9/2009 | Stewart |
| 2009/0270743 A1 | 10/2009 | Dugan et al. |
| 2010/0033303 A1 | 2/2010 | Dugan et al. |
| 2010/0069148 A1* | 3/2010 | Cargill ............... A63B 71/0622 463/25 |
| 2010/0137064 A1 | 6/2010 | Shum |
| 2010/0160041 A1 | 6/2010 | Grant et al. |
| 2010/0240458 A1 | 9/2010 | Gaiba et al. |
| 2010/0287011 A1 | 11/2010 | Muchkaev |
| 2010/0325194 A1 | 12/2010 | Williamson |
| 2011/0065504 A1 | 3/2011 | Dugan et al. |
| 2011/0081973 A1* | 4/2011 | Hall ......................... A63F 1/00 463/42 |
| 2011/0082008 A1 | 4/2011 | Cheung et al. |
| 2011/0190055 A1 | 8/2011 | Leyvand et al. |
| 2011/0260830 A1 | 10/2011 | Weising |
| 2011/0275483 A1 | 11/2011 | Dugan et al. |
| 2012/0029666 A1* | 2/2012 | Crowley ............ A63B 24/0062 700/91 |
| 2012/0252580 A1 | 10/2012 | Dugan |
| 2012/0253487 A1 | 10/2012 | Dugan |
| 2012/0253489 A1 | 10/2012 | Dugan |
| 2012/0306643 A1 | 12/2012 | Dugan |
| 2013/0002435 A1* | 1/2013 | Utter, II ............... A61B 5/0022 340/575 |
| 2013/0006736 A1 | 1/2013 | Bethke et al. |
| 2013/0252731 A1 | 9/2013 | Dugan et al. |
| 2014/0011640 A1 | 1/2014 | Dugan |
| 2016/0263482 A1 | 9/2016 | Dugan |
| 2017/0080340 A1 | 3/2017 | Dugan |

FOREIGN PATENT DOCUMENTS

| | | |
|---|---|---|
| EP | 1 292 218 B1 | 4/2006 |
| EP | 1 702 560 | 9/2006 |
| EP | 1 743 571 A2 | 1/2007 |
| JP | 59-170173 | 9/1984 |
| JP | 08103568 | 4/1996 |
| WO | WO 96/05766 | 2/1996 |
| WO | WO 01/96986 A2 | 12/2001 |
| WO | WO 02/00111 | 1/2002 |
| WO | WO 02/078538 A2 | 10/2002 |
| WO | WO 03/015005 A2 | 2/2003 |
| WO | WO 2004/019172 A2 | 3/2004 |
| WO | WO 2004/032715 A2 | 4/2004 |
| WO | WO 2004/034221 A2 | 4/2004 |
| WO | WO 2005/016124 A2 | 2/2005 |
| WO | WO 2005/027720 A2 | 3/2005 |
| WO | WO 2005/029242 A2 | 3/2005 |
| WO | WO 2005/092177 | 10/2005 |

OTHER PUBLICATIONS

"Bluetooth." Wikipedia: The Free Encyclopedia. Aug. 10, 2009 <http://en.wikipedia.org/wiki/Bluetooth>.
Ichinoseki-sekine et al., "Improving the Accuracy of Pedometer Used by the Elderly with the FFT Algorithm," Medicine & Science in Sports & Exercise 2006,1674-1681.
Mann, W. et al., "Smart Phones for the Elders: Boosting the Intelligence of Smart Homes," Am. Assoc. for Artificial Intell., (AAAI), Jul. 2002.
Office Action of U.S. Appl. No. 13/433,285 dated Feb. 8, 2013.
Jun. 10, 2013 Reply to Feb. 8, 2013 Office Action of U.S. Appl. No. 13/433,285.
Final Office Action of U.S. Appl. No. 13/433,285 dated Aug. 1, 2013.
Response to Final Office Action submitted with RCE of U.S. Appl. No. 13/433,285, filed Dec. 2, 2013.
Office Action of U.S. Appl. No. 13/440,987 dated Jun. 26, 2013.
Dec. 26, 2013 Reply to Jun. 26, 2013 Office Action of U.S. Appl. No. 13/440,987.
Final Office Action of U.S. Appl. No. 13/440,987 dated Feb. 12, 2014.
Examiner Interview Summary of U.S. Appl. No. 13/440,987 dated Feb. 25, 2014.
Office Action of U.S. Appl. No. 13/456,196 dated Nov. 6, 2012.
May 6, 2013 Reply to Nov. 6, 2012 Office Action of U.S. Appl. No. 13/456,196.
Final Office Action of U.S. Appl. No. 13/456,196 dated Aug. 29, 2013.
Response to Final Office Action submitted with RCE of U.S. Appl. No. 13/456,196, filed Dec. 30, 2013.
Examiner Interview Summary of U.S. Appl. No. 13/440,987 dated Mar. 6, 2014.
Amendment Submitted with After Final Consideration Pilot Program of U.S. Appl. No. 13/440,987, filed Apr. 14, 2014.
Advisory Action of U.S. Appl. No. 13/440,987 dated Apr. 22, 2014.
Supplemental Amendment of U.S. Appl. No. 13/440,987, filed May 14, 2014.
Non-Final Office Action of U.S. Appl. No. 13/433,285 dated Dec. 31, 2014.
Non-Final Office Action of U.S. Appl. No. 13/440,987 dated Jan. 29, 2015.
Applicant-Initiated Interview Summary of U.S. Appl. No. 13/433,285 dated Apr. 14, 2015.
Apr. 29, 2015 Reply to Jan. 29, 2015 Non-Final Office Action of U.S. Appl. No. 13/440,987.
Apr. 30, 2015 Reply to Dec. 31, 2014 Non-Final Office Action of U.S. Appl. No. 13/433,285.
Final Office Action of U.S. Appl. No. 13/440,987 dated May 19, 2015.
Final Office Action of U.S. Appl. No. 13/433,285 dated May 28, 2015.
Amendment After Notice of Appeal of U.S. Appl. No. 13/440,987, filed May 18, 2016.
Appeal Brief and Amendment After Notice of Appeal of U.S. Appl. No. 13/433,285, filed May 27, 2016.
Notice of Allowance of U.S. Appl. No. 13/440,987 dated Jun. 6, 2016.
Notice of Allowance of U.S. Appl. No. 13/433,285 dated Aug. 17, 2016.
Amendment after Notice of Allowance (Rule 312) of U.S. Appl. No. 13/440,987, filed Sep. 6, 2016.
Amendment After Allowance of U.S. Appl. No. 13/433,285, filed Nov. 17, 2016.
Non-Final Office Action of U.S. Appl. No. 15/364,241, dated Mar. 10, 2017.
Non-Final Office Action U.S. Appl. No. 15/159,664 dated Mar. 13, 2017.
Jul. 10, 2017 Reply to Mar. 10, 2017 Non-Final Office Action of U.S. Appl. No. 15/364,241.
Jul. 13, 2017 Reply and Terminal Disclaimer to Non-Final Office Action U.S. Appl. No. 15/159,664.
Notice of Allowance of U.S. Appl. No. 15/159,664 dated Sep. 13, 2017.
Examiner Interview and Submission of Terminal Disclaimer of U.S. Appl. No. 15/364,241, filed Oct. 4, 2017.
Notice of Allowance of U.S. Appl. No. 15/364,241 dated Nov. 1, 2017.
Comments on Examiner's Statement of Reasons for Allowance of U.S. Appl. No. 15/364,241, filed Feb. 12, 2018.
Non-Final Office Action of U.S. Appl. No. 15/907,261 dated Oct. 4, 2018.

* cited by examiner

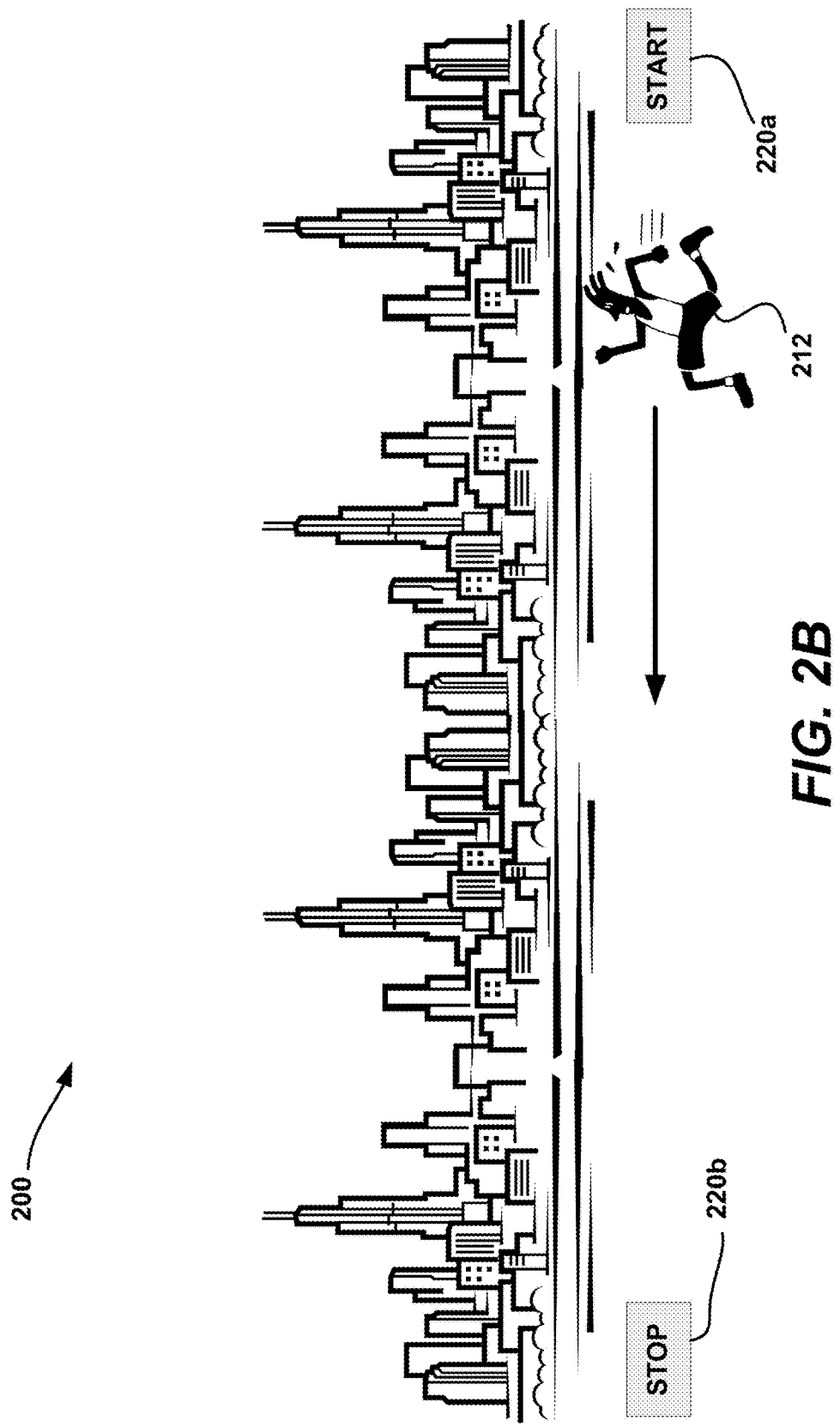

SYSTEMS AND METHODS FOR FITNESS AND VIDEO GAMES

The present application is a continuation of and claims priority to U.S. patent application Ser. No. 15/159,664, filed May 19, 2016 and titled "SYSTEMS AND METHODS FOR FITNESS AND VIDEO GAMES", which is a continuation of and claims priority to U.S. patent application Ser. No. 13/440,987, filed Apr. 5, 2012 and titled "SYSTEMS AND METHODS FOR FITNESS AND VIDEO GAMES", now U.S. Pat. No. 9,610,506, which claims priority to U.S. Provisional Patent Application No. 61/472,191, filed Apr. 5, 2011 and titled "SYSTEMS AND METHODS FOR FITNESS AND VIDEO GAMES", and which is a continuation-in-part and claims priority to U.S. patent application Ser. No. 13/433,285, filed Mar. 28, 2012 and titled "SYSTEMS AND METHODS FOR FITNESS AND VIDEO GAMES", now U.S. Pat. No. 9,533,228, which claims priority to U.S. Provisional Patent Application No. 61/468,444, filed Mar. 28, 2011 and titled "SYSTEMS AND METHODS FOR FITNESS AND VIDEO GAMES". Each of the above applications is hereby incorporated by reference herein in its entirety for all purposes.

FIELD OF THE INVENTION

The present application relates to fitness, and more particularly to systems and methods for fitness and video games.

BACKGROUND

A fitness craze has swept the United States and many other countries. From fat-free potato chips to treadmills, people around the world have become obsessed with weight loss and healthy living. Accordingly, record numbers of new fitness products/exercise equipment have emerged to meet this obsession (including stair climbers, treadmills, recumbent bicycles, ski machines, and the like).

Many pieces of exercise equipment, when used regularly, are very useful for weight loss, for improving cardiovascular stamina, and for strengthening various muscles. However, most exercise equipment suffers from a major drawback: the equipment is boring to use because of its inability to successfully encourage a user (e.g., an exerciser) to continue exercising. As a result, most purchasers of exercise equipment stop using the equipment shortly after purchasing it.

Numerous applications for mobile phones, tablet computers or the like are available for tracking fitness and exercise. Examples include applications that track food consumed, provide work out routines or the like. Such applications continue to grow in popularity.

However, a need exists for mobile applications and systems that motivate an exerciser to continue exercising, exercise harder and have fun.

SUMMARY

In some aspects, a system is provided that includes (1) a plurality of mobile devices; and (2) an application on each mobile device, the application adapted to (a) allow exercisers to form an exercise group; (b) track position or change in position of each exerciser in the exerciser group; and (c) display an avatar having a position that is controlled by a position or change in position of one or more member of the exercise group.

In some aspects, a method for exercising using a mobile device is provided that includes providing an application on a first mobile device. The application adapted to (1) display an avatar on the first mobile device; (2) monitor exercise performed by a user of the first mobile device to obtain monitored exercise information; (3) communicate monitored exercise information from the first mobile device to one or more other mobile devices employed by one or more other users; (4) receive monitored exercise information from one or more other mobile devices employed by one or more other users; (5) display an avatar on the first mobile device; and (6) adjust a position of the avatar on the first mobile device based on monitored exercise information of the first user and monitored exercise information from one or more other mobile devices.

In some aspects, an application for a mobile device is provided that includes program code adapted to allow the mobile device to (1) display a video game have one or more avatars controllable by location information of a user of the mobile device and location information of at least one user of another mobile device; (2) share location information for the mobile device with at least one other mobile device; and (3) obtain location information of at least one other mobile device.

In some aspects, a system is provided that includes a plurality of mobile devices and an application on at least a first mobile device. The application is adapted to track position information regarding the first mobile device, communicate the position information to a web server, receive position information from the web server regarding other mobile devices within a predetermined distance of the first mobile device, and use the position information regarding the other mobile devices to affect one or more characteristics of a video game executed on the first mobile device.

In some aspects, a method is provided that includes (1) executing a video game on a mobile device; (2) receiving position information regarding one or more additional mobile devices within a predetermined distance of the mobile device; and (3) using the position information regarding the one or more additional mobile devices to affect one or more characteristics of the video game executing on the mobile device.

In one or more aspects, an application for a mobile device includes program code adapted to allow the mobile device to (1) execute a video game on the mobile device; (2) receive position information regarding one or more additional mobile devices within a predetermined distance of the mobile device; and (3) use the position information regarding the one or more additional mobile devices to affect one or more characteristics of the video game executed on the mobile device.

Numerous other aspects are provided, as are various methods, apparatus and computer program products for carrying out these and other aspects of the invention. Each computer program product may be carried by a medium readable by a computer (e.g., a carrier wave signal, a floppy disc, a hard drive, a random access memory, etc.).

Other features and aspects of the present invention will become more fully apparent from the following detailed description, the appended claims, and the accompanying drawings.

BRIEF DESCRIPTION OF THE FIGURES

FIG. 2A-C are schematic diagrams of a first exemplary races in which a group may participate and which may be displayed on a mobile device in accordance with the present invention.

DETAILED DESCRIPTION

Embodiments of the present invention provide systems and methods that motivate an exerciser to continue exercising, exercise harder and have fun during exercise. For example, in some embodiments, systems and methods are provided that allow an exerciser to employ a mobile phone, tablet or other similar portable computing device to join a group of exercisers in an exercising program.

Figure 1:
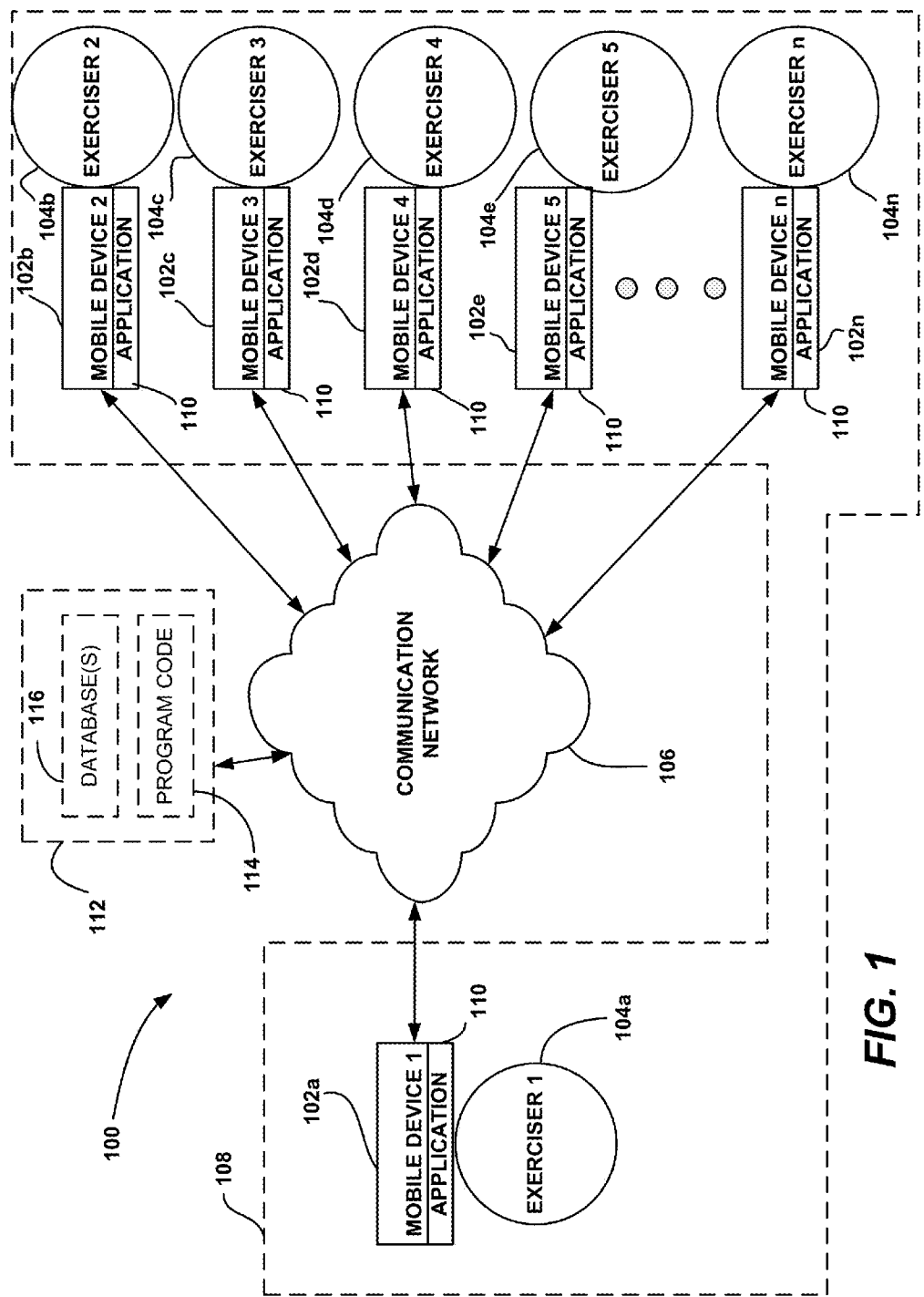
FIG. 1 illustrates a system for employing a mobile device to motivate an exerciser to exercise via communication with one or more other exercisers through one or more other mobile devices over a communication network in accordance with the present invention.

FIG. 1 illustrates a system 100 for employing a mobile device 102a to motivate an exerciser 104a to exercise via communication with one or more other exercisers 104b-n through one or more other mobile devices 102b-n over a communication network 106. The exercisers 104a-n may form an exercise group 108. Mobile devices 102a-n may include mobile (e.g., cellular) phones, other personal digital assistants (PDAs), tablet computers or the like which run an application 110 provided in accordance with the present invention and described further below. Exercisers 104a-n may be runners, cyclers, walkers or any other suitable exercisers. Communication network 106 may be the internet, one or more mobile telephone networks such as a 3G or 4G network, an intranet, a WiFi network or the like.

In one or more embodiments of the invention, each mobile device 102a-n may execute an application 110 that may:
(1) Employ GPS features of the mobile device to track position or change in position of the exerciser using the mobile device;
(2) Determine change in position information of the exerciser;
(3) Prompt the exerciser when and/or for how long the exerciser should change position;
(4) Determine speed information of the exerciser;
(5) Display a representation of the position, change in position, and/or speed of one or more exercisers on one or more of the mobile devices 102a-n;
(6) Communicate messages to one or more exercisers from one or more other exercisers;
(7) Monitor and/or communicate other biometric information of an exerciser such as heart rate, step rate, pulse, distance travelled, speed, etc.;
(8) Communicate position, change in position, heart rate, step rate, pulse, distance travelled, and/or other biometric information to one or more other exercisers, a third party such as family, friends, a doctor, an insurance company, a social network, etc.;
(9) Allow each exerciser to select an exercise group in which to participate; and/or
(10) Display information about the success of one or more exercisers and/or of the group at achieving a goal (e.g., time exercised, distance travelled, speed achieved, heart rate achieved, etc.).

In one particular embodiment, the application 110 may display information about and/or facilitate execution of a race in which each of the exercisers 104a-n may participate. For example, the race may be a relay race, a race between two destinations such as between two cities, across the island of Manhattan, across a state or the like, a race around the world, etc. Exerciser 104a (Exerciser 1) may be directed by mobile device 102a, such as by a visual and/or audio prompt, to exercise by walking, running, cycling or otherwise changing position for a predetermined time period and/or predetermined distance. In some embodiments, the application 110 may track the position of the exerciser 104a (exerciser 1) using a GPS feature of the mobile device 102a and communicate the position information to the exerciser 104a (exerciser 1) and/or to one or more of the mobile devices 102b-n of the exercisers 104b-n (and/or another third party if desired such as a family member, friends, retailers and/or restaurants near the exerciser, a social network site such as Facebook, Google+ or Twitter, etc). Each mobile device 102a-n may display a representation of the exerciser 104a's position (and/or change in position) as the exerciser 104a changes position. Other biometric information may be monitored, communicated and/or displayed such as heart rate, step rate, pulse rate, distance travelled, speed, etc.

Once the exerciser 104a (exerciser 1) completes his/her exercise such as by walking, running, cycling or otherwise changing position for the predetermined time period and/or predetermined distance, the second exerciser 104b (exerciser 2) may be begin exercising by walking, running, cycling or otherwise changing position for a predetermined time period and/or predetermined distance. In some embodiments, the application 110 may track the position of the exerciser 104b (exerciser 2) using a GPS feature of the mobile device 102b and communicate the position information to the exerciser 104b (exerciser 2) and/or to one or more of the mobile devices 102a, 102c-n of the exercisers 104a, 104c-n (exercisers 1, and 3-n). Each mobile device 102a-n may display a representation of the exerciser 104b's position (and/or change in position) as the exerciser 104b changes position. Other biometric information also may be monitored, communicated and/or displayed such as heart rate, step rate, pulse rate, etc. (In some embodiments, the periods in which exercisers exercise may overlap.) The above process may repeat until each exerciser 104a-n has completed an exercise routine. For instance, each exerciser 104a-n may walk, run, cycle or otherwise change position one, two, three, etc., times during the race. Each exerciser 104a-n may exercise the same number or a different number of times during the race. While the above has been described with regard to exercisers changing position, it will be understood that other forms of exercise may be employed in which the exerciser does not change position significantly. For example, an exerciser may run or march in place, perform jumping jacks, etc., all of which may be detected by changes in acceleration measured by accelerometers within a mobile device such as a mobile phone, tablet computer, etc. Alternatively or additionally, heart rate, pulse, acceleration or other biometric monitors may monitor and/or provide biometric information to a mobile device and track exercise.

Figure 2A:
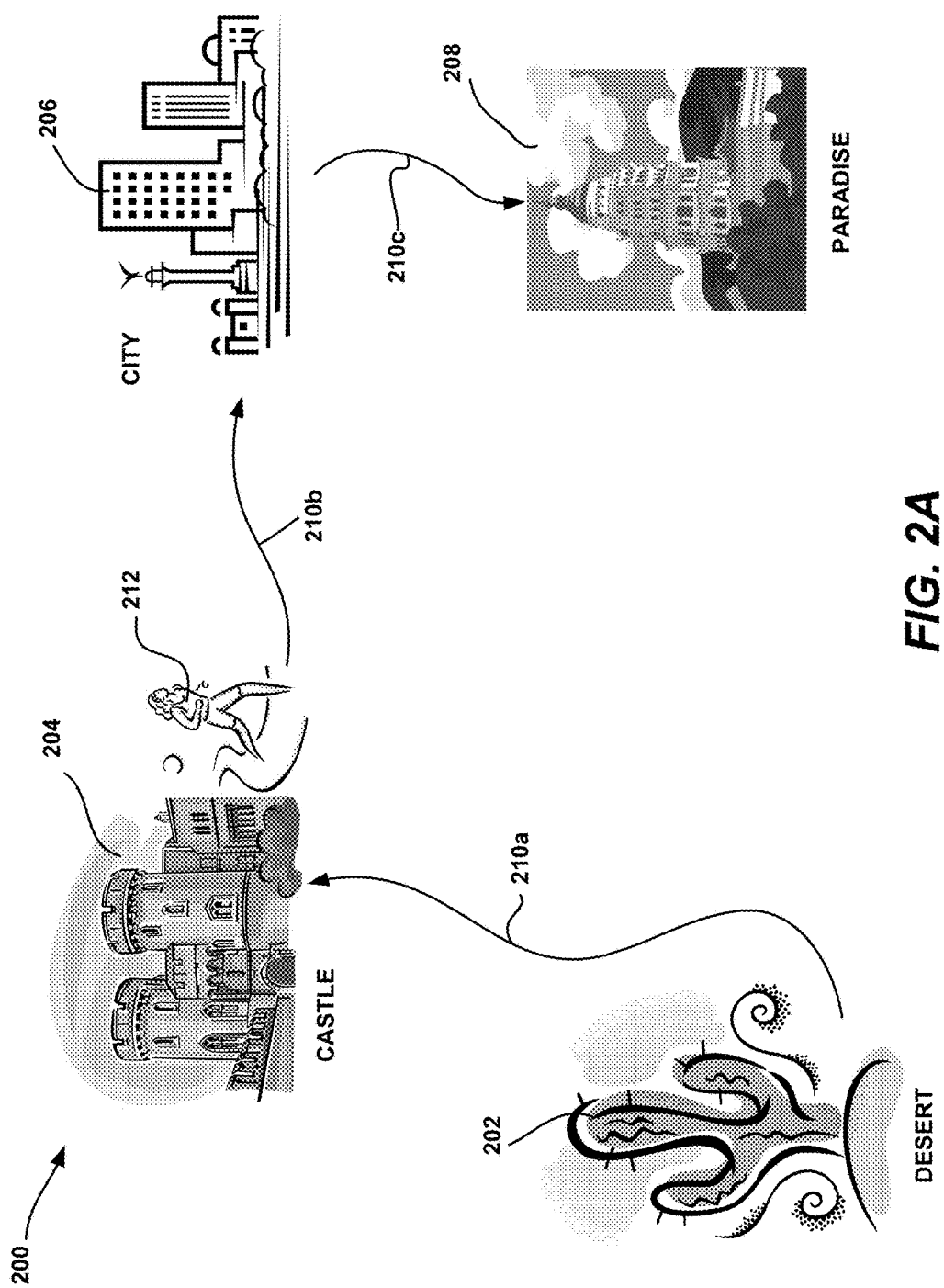

FIG. 2A is a schematic diagram of an exemplary race 200 in which the group 108 may participate and which may be displayed on each mobile device 102a-n using application 110. With reference to FIG. 2A, the race 200 includes four destinations including a desert 202, a castle 204, a city 206 and paradise 208 that are connected by paths 210a-c, respectively. An avatar 212 is shown traversing path 210b between castle 204 and city 206. Fewer, more and/or different destinations may be employed.

In operation, race 200 may be displayed on each mobile device 102a-n via application 110 running on each mobile device 102a-n. In general, each mobile device 102a-n need not be running application 110 simultaneously and exercisers 104a-n may launch application 110 at any time on a respective mobile device 102a-n (or any other suitable device) to check the status of avatar 212 within the race 200. In some embodiments, the program code for managing and/or administering race 200 (or any video game as described below) may reside on a Web server or other server 112 (FIG. 1) in communication with the mobile devices 102a-n and/or may be managed and/or administered by a social networking site such as Facebook, Google+ or Twitter. For example, web server 112 may include program code 114 and/or one or more databases 116 for managing and/or administering the race 200, storing information regarding exercisers 104a-n and/or their exercise activities, allowing new members to join the group 108, filtering potential new group members, etc. Likewise, race status and/or statistics may be displayed and/or viewed on such social networking sites or another web site.

With reference to FIGS. 1 and 2A, the position of avatar 212 is controlled by the exercise (e.g., such as change in position, heart rate, steps taken, other biometric parameters, etc.) of exercisers 104a-n. For example, exerciser 104a (exerciser 1) may be directed by mobile device 102a, such as by a visual and/or audio prompt, to exercise by walking, running, cycling or otherwise changing position for a predetermined time period and/or predetermined distance. In some embodiments, the application 110 may track the position of the exerciser 104a (exerciser 1) using a GPS feature of the mobile device 102a and display a change in position of the avatar 212 in response to a change in position of exerciser 104a. In this manner the avatar 212 may travel along paths 210a-210c between the various destinations 202-208. Each mobile device 102a-n may display the avatar 212 changing position as the exerciser 104a changes position. Each exerciser 104a-n may be assigned a portion or "leg" (portion) of the race 200 to complete by moving a predetermined distance or for a predetermined time period, or otherwise exercising. In some embodiments, the exercisers 104a-n may assist one another by offering encouragement, taking over the leg of the race 200 from another exerciser or the like. The avatar 212 may likewise change position based on biometric data measured for an exerciser such as heart rate, steps taken, pulse, etc.

Figure 2C:
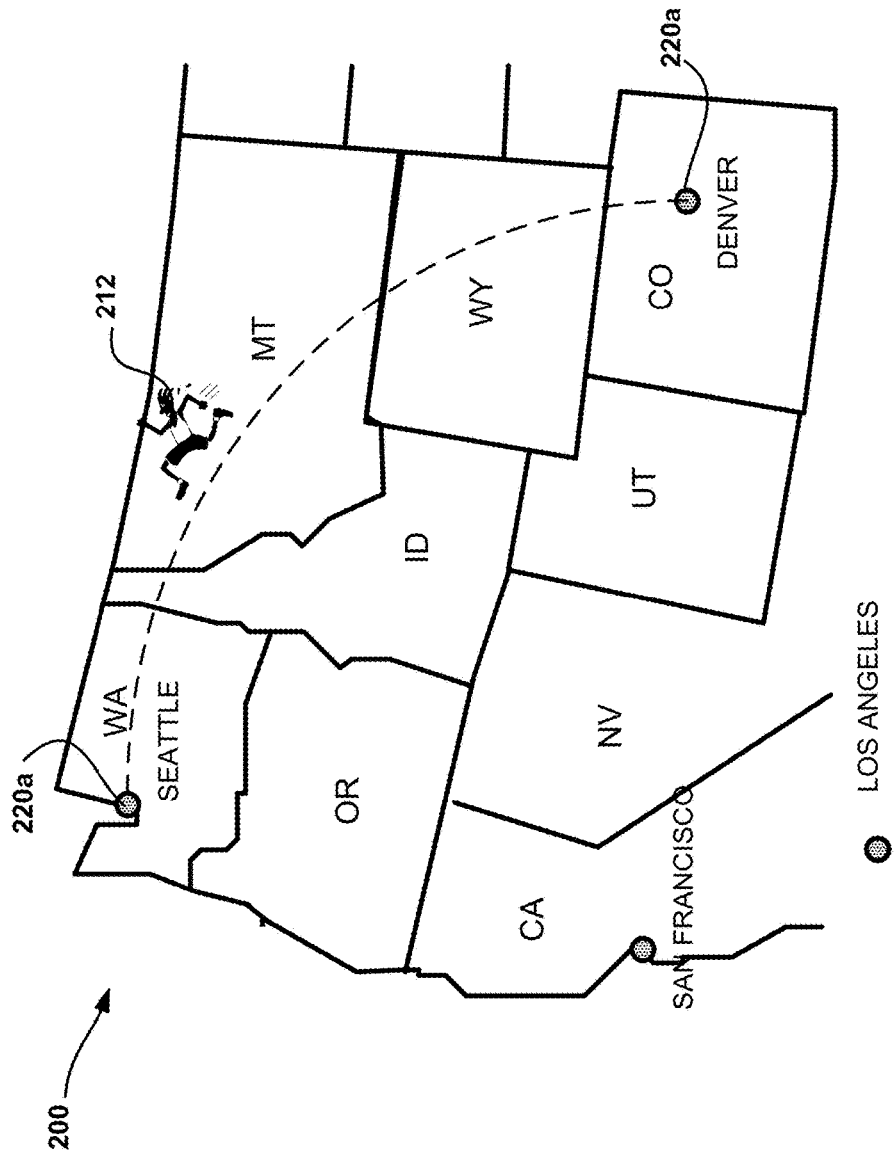

In one exemplary embodiment, the race 200 may be between two locations 220a and 220b, such as across Manhattan, Boston, San Francisco or the like and the avatar 212 may be shown progressing between the two locations 220a, 220b within the city in response to exercise performed by members of the exercise group 108. The "goal" of the race 200 may be to run across Manhattan or another city (e.g., by having the avatar 212 travel between the first and second locations 220a and 220b). Each exerciser 104a-n is motivated to do his/her part to help the group 108 and will experience how much the group can achieve by working together. This is even more pronounced in an embodiments such as shown in FIG. 2C in which avatar 212 travels between cities, such as between Manhattan and Boston, or Denver and Seattle as shown in FIG. 2C, or between any other remote locations (e.g., New York and China). In such embodiments, the avatar 212 is able to travel much farther through activities of the group 108 than would be possible through the activities of an individual. In some embodiments, the race 200 may take days, weeks, months or longer to complete and/or the distance travelled by avatar 212 may be the actual distance travelled by the members of the group 108 during exercise.

Figure 3:
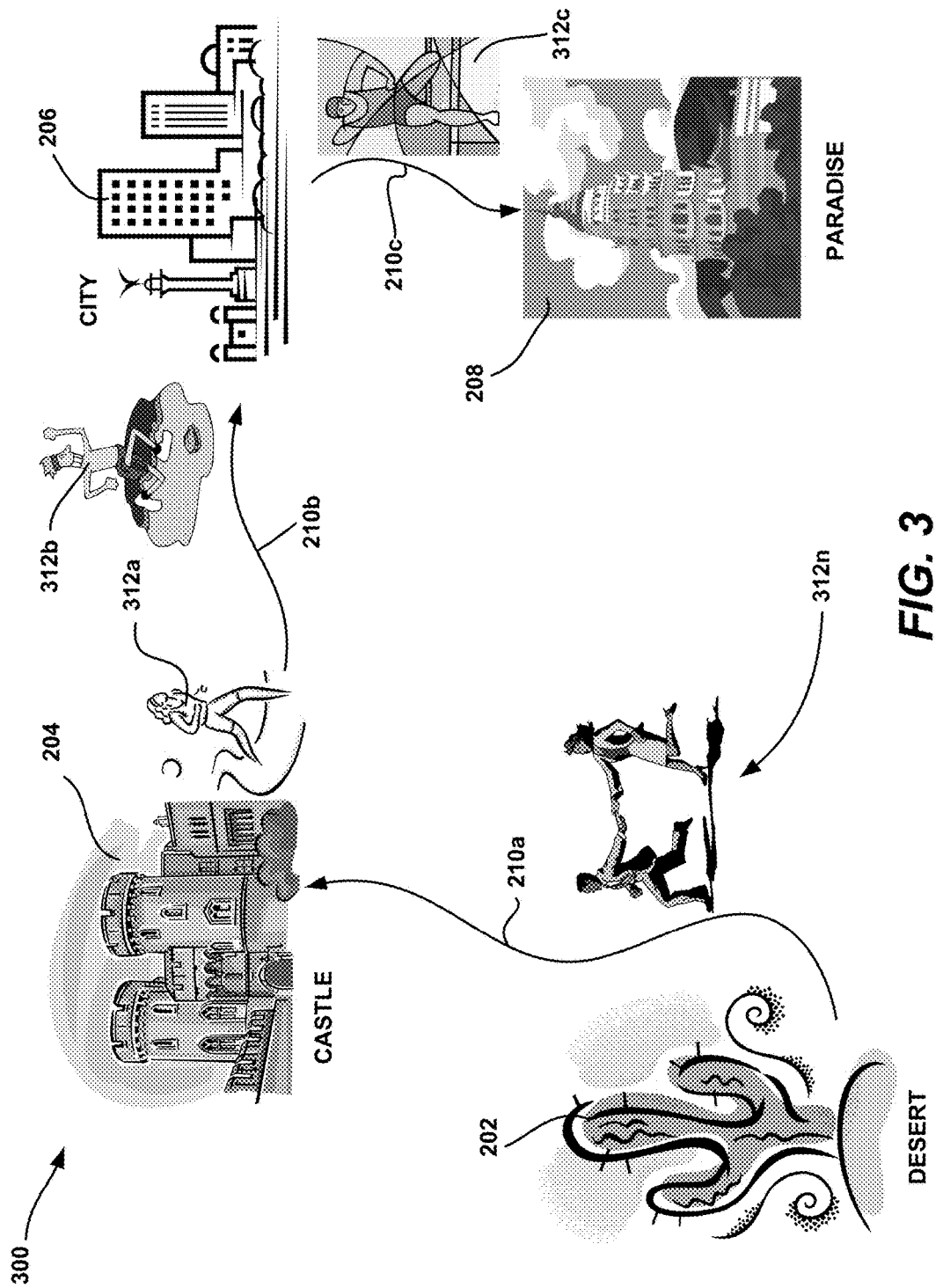
FIG. 3 is a schematic diagram of a second exemplary race in which a group may participate and which may be displayed on a mobile device in accordance with the present invention.

FIG. 3 is a schematic diagram of a race 300 in which multiple exercise groups 108 may compete with one another within the race 300. The race 300 is similar to the race 200, but includes a separate avatar 312a-n for each exercise group 108. In such embodiments, the mobile device of each exerciser in each group may be employed to display the race 300 and (multiple) avatar positions as the exercisers compete. Any number of exerciser groups may compete. In some embodiments, "handoffs" between exercisers within a group may be displayed as shown by avatar 312n which indicates that the current exerciser of an exercise group is ending his/her leg of the race and another member of the exercise group is beginning his/her leg of the race.

Exercisers within a group may not wish to share actual GPS coordinates with other members of their exercise group. Accordingly, in some embodiments, the application 110 may only communicate information representative of position or change in position of an exerciser to other mobile devices. For instance, when exerciser 104a begins his/her leg of a race, the application 110 on the mobile device 102a may treat the exerciser 104a as being at position x=0. Subsequent positions of the exerciser 104a may be adjusted accordingly so as to mask actual GPS coordinates of exerciser 104a. As mentioned, other biometric data such as heart rate, pulse rate, step rate, other parameters mentioned in Table 1 below, or the like may be monitored and employed to affect position, speed or the like of avatars 212 and/or 312a-n.

As stated, in some embodiments, the program code for managing and/or administering a race (or any video game as described below) may reside on a Web server or other server 112 in communication with the mobile devices 102a-n and/or may be managed and/or administered by a social networking site such as Facebook, Google+ or Twitter. In addition to races (e.g., travel from one location to another), other competitive sports activities may include a "virtual" baseball, dodge ball, tennis, hockey, lacrosse, kickball, etc., in which accelerometers within a mobile device are used to detect a kick, jump, swing of a baseball bat (or arm/hand that mimics a swing of a baseball bat), swing of a tennis racquet, hockey stick or lacrosse stick, or the like. For example, with reference to FIG. 4, an exercise group 108 may participate in a virtual baseball game 400 in which each exerciser 104a-n in the group 108 is assigned a position with an avatar 412a-n that is displayed in that position on a virtual baseball field 414 displayed on each mobile device 102a-n. In some embodiments, a remote web server, such as web server 112 in FIG. 1, may be programmed to communicate with the mobile device of each exerciser 104a-n, host the virtual game, issue avatar position updates to each mobile device used by an exerciser 104a-n (e.g., based on biometric or other information received from each mobile device as described below).

Figure 4:
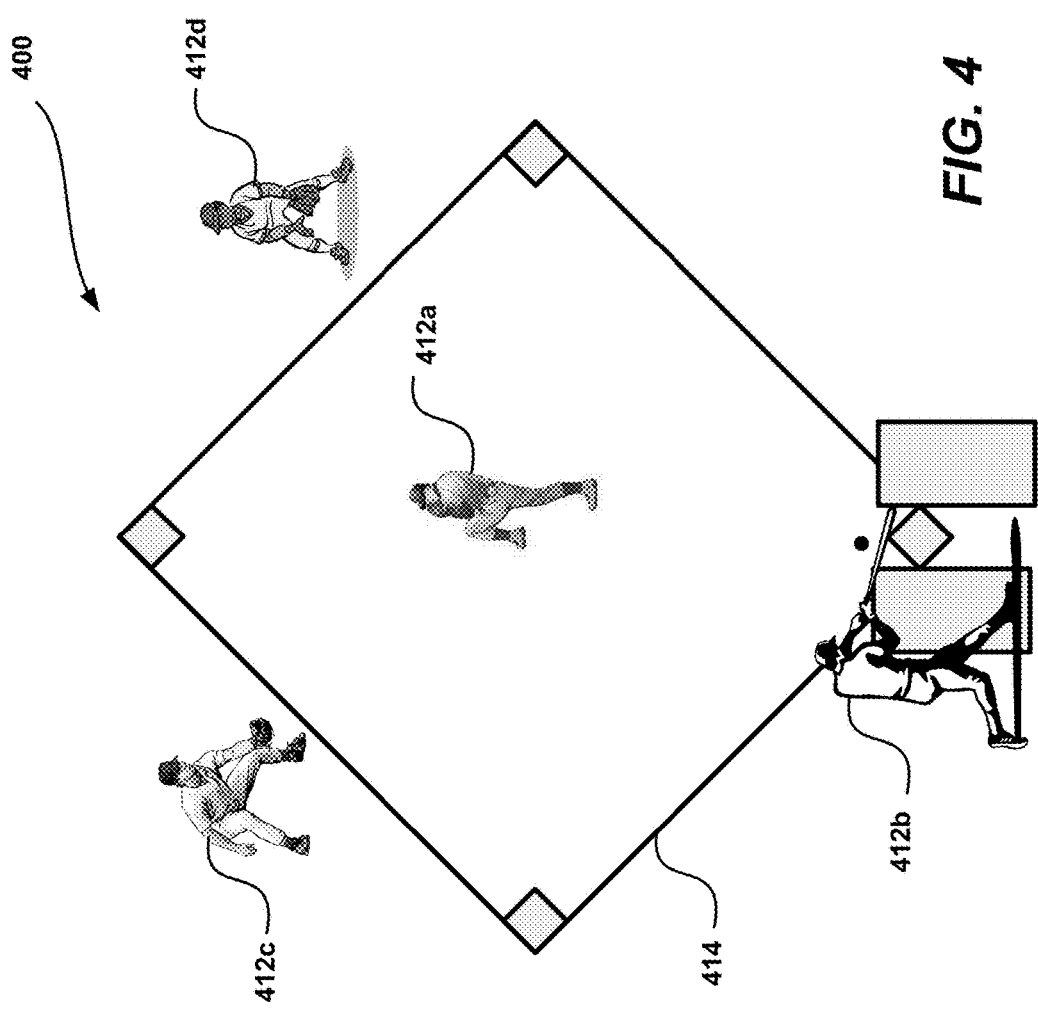
FIG. 4 is an exemplary baseball game in which a group may participate and which may be displayed on a mobile device in accordance with the present invention.

During a game, the position and/or behavior of each avatar 412a-d on a baseball field 414 may be controlled by the GPS location and/or other data measured by each mobile device 102a-n (and/or by biometric data collected by the mobile device 102a-n such as heart rate, speed, cadence, pulse, etc.). For example, exerciser 1 (represented by avatar 412a) may pitch a ball to exerciser 2 (represented by avatar 412b) by pretending to pitch a ball with his/her mobile device. For instance, exerciser 1 (represented by avatar 412a) may hold his/her mobile device in his/her pitching arm, and carry out a pitching motion while holding the mobile device. Accelerometers within the mobile device (or an accelerometer in communication with the mobile device) may measure forces generated during the pitch, for example, by measuring x, y and/or z axis acceleration. Each mobile device 102a-n may display an avatar representative of exerciser 1 pitching a ball and/or ball speed in the "virtual" game may be based on the real world pitch of exerciser 1 (e.g., as measured by accelerometers in the mobile device of exerciser 1, one or more external accelerometers in communication with the mobile device of exerciser 1 such as an accelerometer mounted in a write band, or the like). Exerciser 2 (represented by avatar 412b) may hit the ball pitched by exerciser 1 (represented by avatar 412a) by swinging his/her mobile device at the appropriate time based on the pitch of exerciser 1 (represented by avatar 412a) or by performing some predetermined exercise requirement (e.g., running for a predetermined time, distance and/or speed, maintaining a predetermined heart rate range for a predetermined time, or the like). Assuming exerciser 2 (represented by avatar 412b) actually hits the virtual ball (e.g., swings his/her mobile device at the correct time or performs a predetermined exercise requirement), each mobile device 102a-n may display a ball being hit by the avatar 412b of exerciser 2. Exerciser 3 (represented by avatar 412c), who may be playing infield or outfield, may catch the ball hit by exerciser 2 by running or performing some other predetermined exercise so as to cause his/her avatar 412c to run toward the virtual ball hit by the avatar 412b of exerciser 2. Exerciser 3 may "catch" the ball hit by exerciser 2 using his/her mobile device, for example. In general, all types of ball play may be similarly conducted using the accelerometers and/or GPS features of mobile devices 102a-n (or external biometric measurement devices that provide biometric information to the mobile devices). Other virtual games may be similarly played such as tennis, football, basketball, hockey, volleyball, or the like. While only four avatars are shown in FIG. 4 representing four exercisers, it will be understood that fewer or more exercisers and/or avatars may be employed.

Note that virtual game play may or may not be performed in real time. In some embodiments, the position or other characteristics of an avatar may be changed during or after exercise is performed.

In one or more embodiments, an exercise group, such as a group of friends, a group with members that share certain characteristics such as similar age, interests, historical exercise performance, education, or the like (which in some embodiments may be identified via a social networking site), may agree to play a virtual game while each group member works out. For instance, one group member may wish to work out at a local gym, while another may wish to work out in his/her home, etc. As described above, each gaming device such as a cellular telephone, tablet computer, etc., may include an application which displays a video game in which each group member may control one or more aspects of the video game. For instance, each group member's exercise may control the position, speed, movement or the like of a video game character. In this manner a group of friends may be motivated to work out together. Similarly, an exerciser may enter a "pick up" game with previously unknown exercisers. In a further example, such games may be used in a match-making embodiment (e.g., to introduce people with similar interests and/or geographic location that meet predetermined criteria such as age, education, marital status, or the like). For example, a first exerciser may be at a local health club and wish to meet another exerciser within the health club. He/she may send out a request for someone within the health club to participate and/or compete in a video game or virtual competition. In some embodiments, an application on a mobile device may be used to access a social networking cite to identify exercise partners. That is, application 110 may access a web site to identify exercisers at the health club. For instance, the health club may maintain a Facebook or similar page that may be used to identify exercisers currently at the health club that may wish to interact, such as train or compete, with other exercisers at the health club. The request may include filters such as required characteristics of the invited exerciser (e.g., female, single, age, employment status, etc.). Accordingly, an application with such functionality may be provided to execute on a mobile device or other gaming device of the exercisers. Specifically, in some embodiments, application 110 may include computer program code that allows an exerciser to indicate a desire to participate with local exercisers; identify the current location of the exerciser (e.g., using GPS features of the mobile device executing application 110 or by selection by the exerciser); and communicate position information to a web site. The web site may employ geographical information about the exerciser to identify other nearby exercisers that have indicated a desire to exercise with others. The web site may then introduce the exercisers (e.g., by specifying where the exercisers can meet or by introducing avatars of the exercisers on respective mobile devices). In some embodiments, the web site may host a virtual game/race as described above. Any suitable biometric information may be monitored during exercise such as position, speed, heart rate, cadence, etc.

Figure 5:
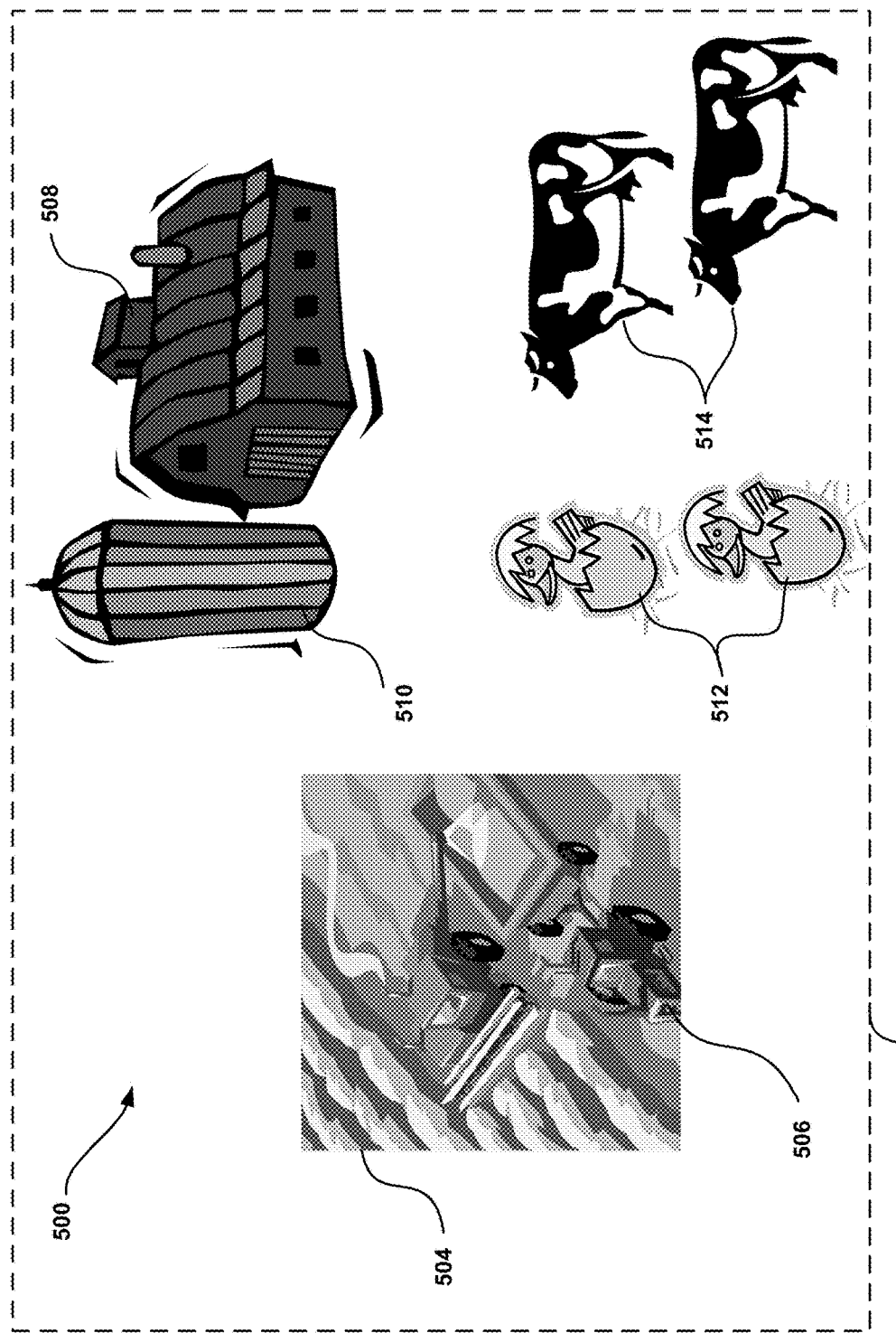
FIG. 5 is an exemplary social network game in which a group may participate and which may be displayed on a mobile device in accordance with the present invention.

FIG. 5 is a schematic diagram of an exemplary video game 500 for use by mobile devices 102a-n via a Web server or other server 112 in communication with the mobile devices 102a-n and/or may be managed and/or administered by a social networking site such as Facebook, Google+ or Twitter. In the embodiment of FIG. 5, a virtual farm 502 is provided that includes crops 504, a tractor 506, a barn 508, a silo 510, chickens 512, cows 514 and/or any other typical farm items (not shown). In some embodiments, the goal of such a video game 500 may be to grow more crops, buy more land, obtain more eggs, chickens, cows or milk, plow fields, harvest crops, or the like. In accordance with embodiments of the present invention, performance of such activities may be enhanced by exercise of one or more exercisers 104a-n. For instance, if exerciser 104a is playing the video game 500, exerciser 104a may be assigned (or establish) an exercise goal such as a number of miles to walk or run, a number of minutes to walk or run on a treadmill, a length of time to perform an aerobics routine, a number of jumping jacks to perform, etc. Completion of such goals may be monitored by a mobile device 102a-n as previously described (e.g., through use of accelerometers of the mobile device or external accelerometers, GPS-features, use of heart rate monitors, verification by a third party such as a friend or health club staff, etc.). In exchange for completion (or partial completion) of the exercise goal, an exerciser may be rewarded with more land, more or heartier crops, more cows or more milk production from cows, new farm animals or equipment, gas or diesel fuel for farm equipment, more grain in the silo 510, more tokens or virtual money for farm item purchases, or the like.

In some embodiments, an exercise group 108 may be assigned to a farm (e.g., a community farm). Exercisers 104*a-n* within the exercise group 108 may be assigned farm tasks that are enhanced by exercise as described above. Being a part of such a group may be provide additional motivation for each exerciser 104*a-n* to complete regular exercise (e.g., due to peer pressure).

In some embodiments, an application 110 for a mobile device is provided that includes program code adapted to allow the mobile device to display and interact with a virtual farm having one or more avatars controllable by location and/or other exercise information of a user of the mobile device. For example, the application 110 may track location and/or other exercise information such as heart rate, pulse, steps, etc., and reward the exerciser with enhanced game play within the virtual farm environment (e.g., more land, more or heartier crops, more cows or more milk production from cows, new farm animals or equipment, gas or diesel fuel for farm equipment, more grain in the silo, more tokens or virtual money for farm item purchases, or the like). In one or more embodiments, the application 110 may share location information with at least one other mobile device and/or obtain location information of at least one other mobile device. In some embodiments, the program code may be adapted to allow a user of the mobile device to join an exercise group and communicate with mobile devices of other members of the exercise group (e.g., within the virtual environment).

Other Embodiments

The exercisers 104*a-n* may wish to have a more interactive experience. Accordingly, in some embodiments, the race 200 and/or 300 may be part of a video game in which the avatar 212 and/or avatars 312*a-n* encounter monsters, snipers, assassins, wild animals, obstacles or other typical video game scenarios that the avatar(s) must navigate through and/or survive. In this regard, if exerciser 104*a* is currently exercising, his/her exercise level may directly affect video game play of either the exerciser 104*a* or of the other exercisers 104*b-n*. For instance, exercise of exerciser 104*a* may be employed to affect the speed, striking force, game level, etc., of the avatar 212. Exemplary video game character performance levels that may be affected by a measured exercise parameter are shown below in Table 1. Such parameters may be measured using suitable sensors such heart rate monitor chest straps, pedometers, accelerometers, or the like.

TABLE 1

| MONITORED EXERCISER PERFORMANCE LEVEL | VIDEO GAME CHARACTER PERFORMANCE LEVEL CONTROLLED |
|---|---|
| pedaling rate | speed, striking force |
| stepping rate | speed, striking force |
| rowing rate | speed, striking force |
| running rate | speed, striking force |
| pulse rate | speed, energy level, accuracy |
| striking force | striking force |
| swing velocity | swing velocity |

TABLE 1-continued

| MONITORED EXERCISER PERFORMANCE LEVEL | VIDEO GAME CHARACTER PERFORMANCE LEVEL CONTROLLED |
|---|---|
| distance traveled | game level |
| time exercised | game level |

In one example, exercise of exerciser 104*a* may be used to control speed, striking force or game level of a video game in which avatar 212 is a character. One or more of the other exercisers 104*b-n* in group 108 may control other parameters of the avatar 212 such as movement to the right, left, up, down, other movements such as jumping, kicking, firing a weapon, steering a car, etc. For instance, while exercising, the exerciser 104*a* may not be free to use his/her hands to manipulate the mobile device 102*a* in a manner that would cause the avatar 212 to turn right or left, kick, jump, fire a weapon, etc. Nonetheless, the exercise of the exerciser 104*a* may be used to affect the speed, striking force, game level, etc., of the avatar 212. One or more of the other exercisers 104*b-n* in group 108 who is/are not exercising may use his/her respective mobile device 102*b-n* to cause movement of the avatar 212 to the right or left, to kick, etc., or otherwise proceed through the video game (e.g., using accelerometers within the mobile device, tapping the screen of the mobile device, etc.) while the exerciser 104*a* is exercising.

Figure 6:
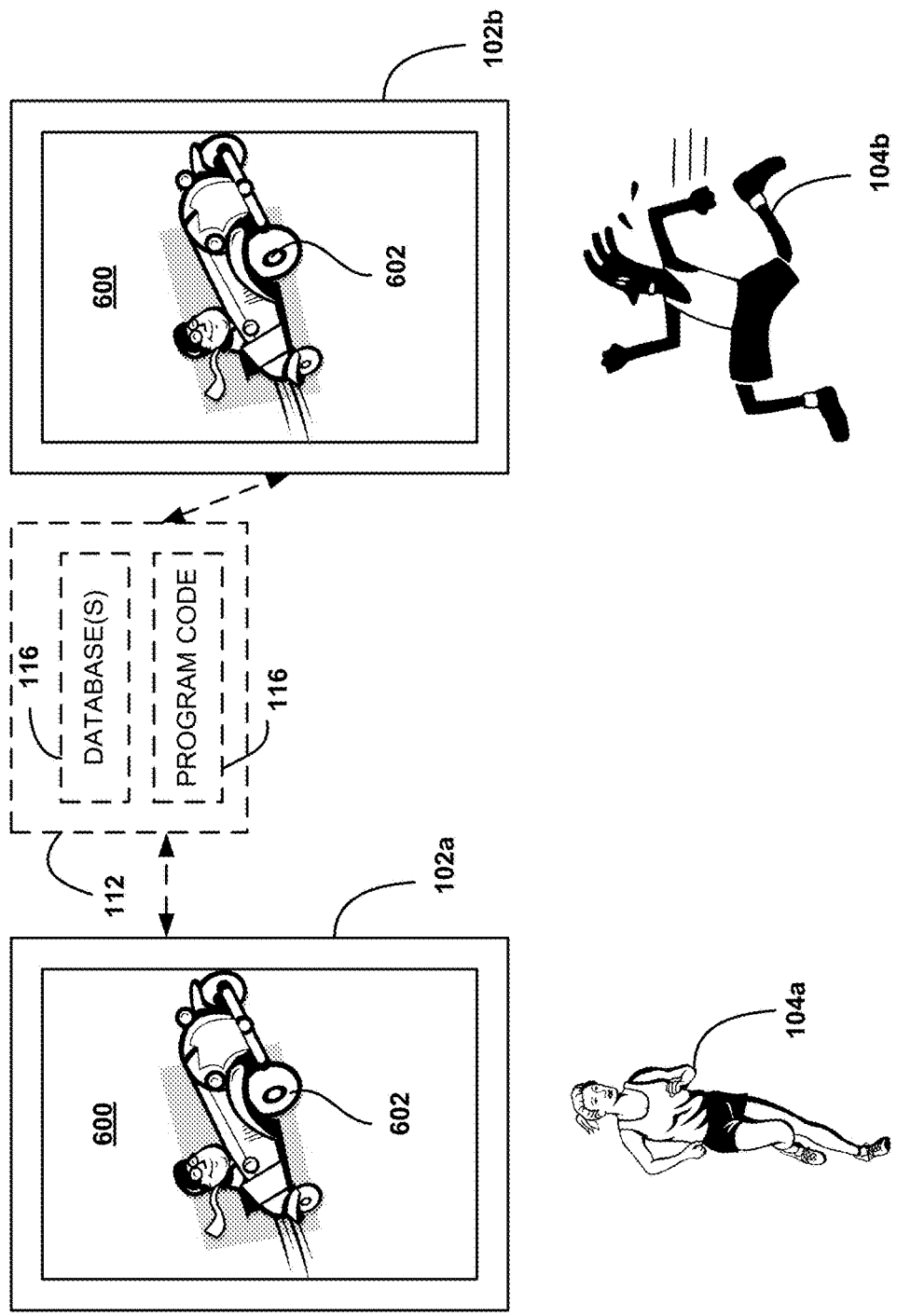
FIG. 6 is an exemplary car race in which a group may participate and which may be displayed on a mobile device in accordance with the present invention.

In some embodiments, primary control of the avatar 212 may pass back and forth between two or more members of an exercise group over and over during a work out routine (e.g., as the person exercising changes). For example, FIG. 6 is a schematic diagram of a video game 600 executing on mobile devices 102*a* and 102*b* of exercisers 104*a* and 104*b*, respectively. Other numbers of mobile devices and/or exercisers may be used.

Mobile devices 102*a-b* include an application for the video game 600. In the example shown, a race car 602 is shown. Any other video game type, character, setting or the like may be used (as described above, for example). Mobile devices 102*a-b* may communicate with each other directly, such as via WIFI, a cellular network, some other protocol, etc., or may communicate indirectly through a web server 112 or similar system. In the embodiment shown, control of the steering and/or braking of car 602 is controlled by the exerciser 102*a* or 102*b* who is not exercising, while control the speed of the car 602 is controlled by the exerciser 102*a* or 102*b* who is exercising. Who exercises when and/or for how long may be determined by the exercisers 102*a*, 102*b*, a third party such as other members of an exercise group, a trainer, a retailer that may offer rewards for completing an exercise program, or the like. For instance, in some embodiments, web server 112 may host a web interface in which the race 600, or information or statistics about the race 600, may be observed. Through such a web interface, an exerciser or other party may enter a desired exercise duration for the game 600, when and/or for how long each exerciser will exercise, etc. Such information may be communicated to the mobile devices 102*a-n* before and/or during game play, for example.

In one or more embodiments, a mobile device 102*a* may include an application 110 having computer program code adapted to (1) log into a web site; (2) indicate a desire to join an exercise group and/or select an exercise group to join; (3) specify duration and/or type of exercise desired; (4) specify who in a group will exercise when and/or for how long; (5)

receive an indication from the web site when an exerciser should begin exercising; (6) receive updates from the web site regarding how an exerciser within the group is progressing; (7) display changes in the video game in response to exercise (e.g., change in position of an avatar in response to exercise performed by members of the group); (8) display changes in the video game in response to inputs from members of the group (e.g., direction, speed or other behavior of an avatar); and/or (9) allow users to control one or more aspects of the video game when not exercising (e.g., direction, speed, or other behavior of an avatar). In some embodiments, a web site hosting such a group may offer incentives, rewards or the like to group members for being in the group, achieving exercise objectives, etc., (e.g., coupons to restaurants, virtual tokens or rewards for on-line social games, etc.).

In other embodiments, the exerciser 104a may control movements of an avatar as well. In one particular embodiment, an application 110 may be adapted to process voice commands of the exerciser 104a to control movement or other behaviors of an avatar. Exemplary voice commands are shown in Table 2 below.

TABLE 2

| VOICE COMMAND OF EXERCISER | VIDEO GAME CHARACTER CHARACTERISTIC CONTROLLED |
|---|---|
| "L" or "Left" | turn left |
| "R" or "Right" | turn right |
| "J" or "Jump" | jump |
| "D" or "Duck" | duck or drop to the ground |
| "B" or "Back" | move back |
| "K" or "Kick" | kick |
| "F" or "Fly" | fly |

In other embodiments, another sound of exerciser 104a may be used to control the avatar, such as a "clacking" sound. For instance, the exerciser 104a may clack his/her tongue once to turn right, twice to turn left, thrice to jump, etc., similar to Morse code. In some embodiments, the exerciser 104a may select/record sounds that are to be interpreted by the application 110 to correspond to turning left or right, jumping, ducking, kicking with a left or right leg, flying, etc.

Additional Embodiments

Figure 7:
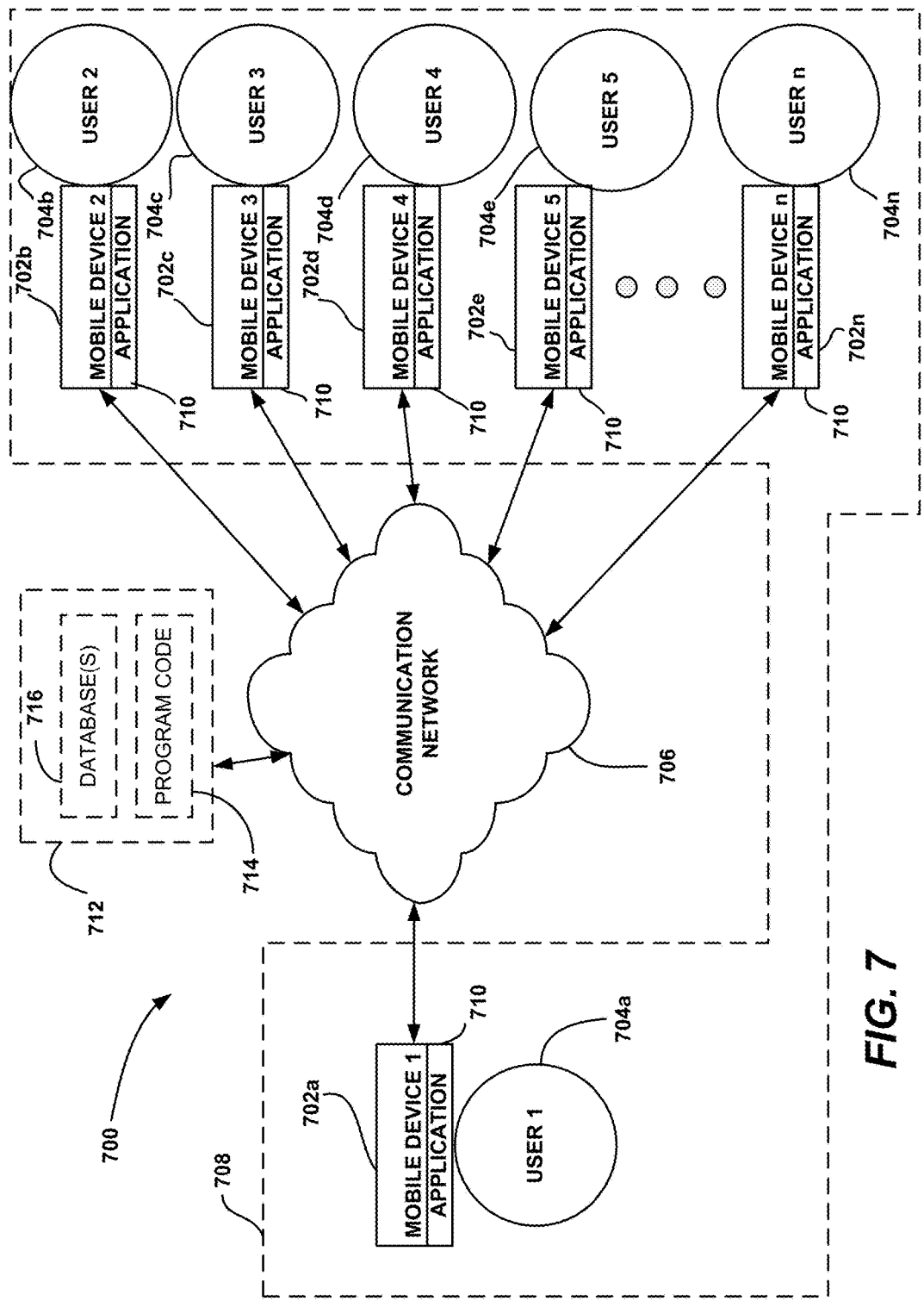
FIG. 7 is a schematic diagram of a system for employing proximity of other mobile device users to affect game play in accordance with the present invention.

In some embodiments, a gaming device such as a mobile telephone, tablet computer, or the like, may include a video game with characteristics that change based on the number of other gaming devices near the gaming device. For example, FIG. 7 is a schematic diagram of a system 700 for employing proximity of other mobile device users to affect game play. With reference to FIG. 7, a plurality of mobile devices 702a-n associated with users 704a-n are shown each running an application 710. Fewer or more mobile devices and/or users may be present. Application 710 is adapted to communicate over a communication network 706 to a web server 712 (having program code 714 and one or more databases 716).

In operation, application 710 may be executed on numerous mobile devices such as cellular telephones, tablet computers or the like. Each mobile device executing application 710 may communicate location information regarding its respective mobile device to web server 712 and web server 712 may collect, aggregate and/or otherwise assemble location information. In some embodiments, web server 712 analyzes the collected location information to determine a group 708 of mobile devices 702a-n that are within a predetermined distance of each other (e.g., same room, building, block, city, state, etc.). The distance may be selected by the web server 712, or in some embodiments, based on a user of a mobile device (e.g., mobile device 102a in this example). For instance, user 704a may wish to play a video game having characteristics that vary based on the number of people near the user 704a at any given time. User 704a may specify what distance away from the user 704a a person must be to affect game play (e.g., 10, 20 or 30 feet, 100 yards, same city block, 1 mile, same city, etc.). Web server 712 then may communicate with the application 710 executing on mobile device 702a to communication how many people (e.g., mobile device users) are near user 704a. Application 710 may include a video game, or interact with another video game on mobile device 702a, so that the number of people specified by web server 712 affects game play on mobile device 702a. Alternatively or in additional, web server 712 may provide position information, or relative position information to mobile device 702a, for mobile users near user 704a, and application 710 may use this information to affect game play. For instance, a number, density, location, or the like of background characters in a video game may be based on the information provided by web server 712 (e.g., an opposing team's army size, the number of monsters in a game, the density of a forest in the game, or any other relevant video game parameter). In this manner, a dynamically changing video game is provided that is affected by real world activities. Note that application 710 need not be identical on each mobile device 702a-n (e.g., some applications 710 may be communicating information to web server 712 for other purposes).

In general, the application 710 may monitor whether mobile devices are within a predetermined geographic area of one another, such as by using GPS location information from each mobile device. Characteristics of a video game running on one or more of the mobile devices may depend on or otherwise be affected by the number or proximity of other mobile devices (e.g., video game characteristics such as the number or position of video game characters within the video game, the landscape or background characteristics of the video game, etc.). In some embodiments, biometric information collected by each mobile device such as heart rate, speed, etc., similarly may be used to affect the video game by affecting the speed, strength, position, etc., of characters within the video game). Further, in some embodiments, certain game levels, movements, etc., may only be possible within the video game if a large enough (or small enough) number of mobile devices are present within a predetermined location (e.g., if enough people are at a restaurant, concert, or other venue). For instance, a restaurant, concert hall or other venue may host a gaming event and provide incentive within the venue or with the video game based on a number of attendees (e.g., free food, higher gaming level, etc.).

In some embodiments, the video game may communicate with a social networking site such as Facebook, Google+ or Twitter, and such social networking sites may identify or notify friends or affiliated groups of the presence of friends or members within a particular geographic area (e.g., using GPS features of mobile devices). Such friends or affiliated groups may be prompted to participate in video games or to otherwise interact.

In one or more embodiments, video game characteristics of a video game may be affected by location information of the mobile device executing the video game. For instance, a user may only enter a certain game level if he/she is physically located at a particular location such as a restaurant, a mall, a computer store, a city, a monument, or the like. The user's position may be determined, for example, using GPS features of the mobile device (e.g., mobile device 702a may do this directly, or mobile device 702a may communicate position information to web server 712, and web server 712 may provide access to the game level or other benefit based on the position information).

In yet other embodiments, location information from mobile devices may be collected and/or aggregated to track position, travel habits, etc., of a group of people such as lawyers, doctors, gamers, etc., that are members of a social network. In fact, a virtual world or map may be generated by tracking the position of one or mobile devices during any given time period. In some embodiments, such information may be used to affect video game characteristics such as game environment, number of video game characters, or the like. For instance, web server 712 may collect position information for members of a legal group on a networking web site and provide this information for use in a video game (e.g., as described above).

In some embodiments of the invention, a system is provided that includes a plurality of mobile devices and an application on at least a first mobile device. The application is adapted to track position information regarding the first mobile device, communicate the position information to a web server, receive position information from the web server regarding other mobile devices within a predetermined distance of the first mobile device, and use the position information regarding the other mobile devices to affect one or more characteristics of a video game executed on the first mobile device.

In one or more embodiments, a user of the first mobile device may select how position information affects the video game (e.g., what characteristics of the game are affected by the number of people near the user, such as a number of enemies in the video game, landscape, game level, etc.), and/or the predetermined distance. Alternatively, the web server may select one or more of how position information affects the video game and the predetermined distance. The position information may include a number of other mobile devices within the predetermined distance, a density of mobile devices, or any other relevant position information. In some embodiments, the web server may provide incentives if a predetermined number of mobile devices are within the predetermined distance, such as coupons or discounts to restaurants or other retail establishments.

The foregoing description discloses only exemplary embodiments of the invention; modifications of the above disclosed apparatus and method which fall within the scope of the invention will be readily apparent to those of ordinary skill in the art. For instance, any number of performance levels of an exerciser may be monitored and used to control any number of performance levels of a video game character. Further, old video games may be modified for use with the present invention, or new video games may be developed.

In some embodiments, exercisers may join exercise groups via a social networking site such as Facebook, Google+ or Twitter. Such social networking sites may collect information on the exercisers and make recommendations for exercise groups based on age, weight, type of exercise, geographic location or the like.

In some embodiments, exercisers training for a marathon or other exercise goal may be identified by a social networking site (e.g., based on hobbies, interests, or other identifying data posted by the exerciser on the social networking site). One or more exercisers, or the social networking site itself, may invite like exercisers to join a training group. In some embodiments, retail businesses such as clothing stores, restaurants, cellular telephone providers, or the like, may offer members of the group discounts such as reduced rate clothing, discounted meals, reduced cell phone rates or free minutes (e.g., for calls between group members) or the like.

In some aspects, a method for exercising using a mobile device is provided that includes providing an application on a first mobile device. The application adapted to (1) display an avatar on the first mobile device; (2) monitor exercise performed by a user of the first mobile device to obtain monitored exercise information; (3) communicate monitored exercise information from the first mobile device to one or more other mobile devices employed by one or more other users; (4) receive monitored exercise information from one or more other mobile devices employed by one or more other users; (5) display an avatar on the first mobile device; and (6) adjust a position of the avatar on the first mobile device based on monitored exercise information of the first user and monitored exercise information from one or more other mobile devices. The monitored exercise information may exchanged between mobile devices via a remote web server, such via a social network web site running on the remote web server.

In some aspects, an application for a mobile device is provided that includes program code adapted to allow the mobile device to (1) display a video game have one or more avatars controllable by location information of a user of the mobile device and location information of at least one user of another mobile device; (2) share location information for the mobile device with at least one other mobile device; and (3) obtain location information of at least one other mobile device. In some embodiments, the program code may be adapted to allow a user of the mobile device to join an exercise group; and communicate location information for the mobile device with mobile devices of other members of the exercise group. In some embodiments, the program code may be adapted to communicate with mobile devices of other members of the exercise group through a social network web site. In additional embodiments, the program code may be adapted to switch control of motion of the avatar on the mobile device between the user of the mobile device and a user of another mobile device.

In some embodiments, one or more of the methods or processes described above may be implemented, at least in part, in computer program code and/or may form a computer program product. Each computer program product may be carried by a medium readable by a computer (e.g., a carrier wave signal, a floppy disc, a hard drive, a random access memory, etc.). In general, information about a user (e.g., an exerciser) may be provided to the server 112 or another computer by any mechanism (e.g., via mail, via e-mail, via telephone, via cellular telephone, via facsimile, etc.). For example, information may be received via one or more HTTP transmissions or via some other communications protocol.

Accordingly, while the present invention has been disclosed in connection with exemplary embodiments thereof, it should be understood that other embodiments may fall within the spirit and scope of the invention, as defined by the following claims.

The invention claimed is:

1. A system to motivate a user to exercise harder comprising:
   a mobile device associated with a user; and
   an application stored in the mobile device, the application, when executed by the mobile device, providing:
      a position tracking function operable to employ GPS features of the mobile device to track positions of the user of the mobile device;
      a communication transmission function operable to employ communication facilities of the mobile device to communicate position information of the user of the mobile device to a server;
      a communication reception function operable to employ the communication facilities of the mobile device to receive position information of other users from the server;
      a monitor function operable to employ the position information of the other users from the server to identify other users within a predetermined distance of the user and operable to employ information from one or more sensors in communication with the user's mobile device to determine a level of exercise of the first user; and
      a video game executing on the mobile device, operable to employ the position information of the other users, wherein a game level of the video game is set based upon both the level of exercise of the user, and a number of other users identified within a predetermined distance of the user;
      wherein setting the game level includes providing movement capabilities to a video game avatar of the user, wherein the movement capabilities of the user's video game avatar are improved for playing the video game;
      wherein the monitor function is further operable to determine a number of other users within the predetermined distance from the user; and
      wherein the server is operable to provide incentives if a predetermined number of other users are within the predetermined distance of the user.

2. The system of claim 1 wherein the mobile device is a mobile telephone.

3. The system of claim 1 wherein the user may select one or more of how the position information of other users affects the video game and the predetermined distance.

4. The system of claim 1 wherein the server may select one or more of how the position information of other users affects the video game and the predetermined distance.

5. The system of claim 1 wherein a third party in communication with the server can set at least one of a value for the predetermined number of other users and the predetermined distance required before the incentives are transmitted to the user.

6. The system of claim 1 wherein the user may select how position information of other users affects a number of background characters present in the video game.

7. The system of claim 1 wherein the server may select how position information of other users affects a number of background characters present in the video game.

8. The system of claim 1 wherein the user may select how position information of other users affects a number of background characters present in the video game based on a number of other users within the predetermined distance.

9. A system to motivate a user to exercise harder comprising:
   a mobile device associated with a user; and
   an application stored in the mobile device, the application, when executed by the mobile device, providing:
      a position tracking function operable to employ GPS features of the mobile device to track positions of the user of the mobile device;
      a communication transmission function operable to employ communication facilities of the mobile device to communicate position information of the user of the mobile device to a server;
      a communication reception function operable to employ the communication facilities of the mobile device to receive position information for other users from the server;
      a monitor function operable to employ the position information for the other users from the server to identify other users within a predetermined distance of the user and operable to employ information from one or more sensors in communication with the user's mobile device to determine a level of exercise of the user; and
      a video game executing on the mobile device, operable to employ the position information of the other users, wherein a game level of the video game is set based upon both the level of exercise of the user, and a number of other users identified within a predetermined distance of the user;
      wherein setting the game level includes providing movement capabilities to a video game avatar of the user, wherein the movement capabilities of the user's video game avatar are improved for playing the video game;
      wherein the user may select one or more of how the position information of other users affects the video game and the predetermined distance.

10. The system of claim 9 wherein the mobile device is a mobile telephone.

11. The system of claim 9 wherein the server may select one or more of how the position information of other users affects the video game and the predetermined distance.

12. The system of claim 9 wherein the monitor function is further operable to determine a number of users within the predetermined distance from the user.

13. The system of claim 12 wherein the web server is operable to provide incentives if a predetermined number of users are within the predetermined distance of the user.

14. The system of claim 9 wherein a third party in communication with the server can set at least one of a value for the predetermined number of other users and the predetermined distance required before the incentives are transmitted to the user.

15. The system of claim 9 wherein the user may select how position information of other users affects a number of background characters present in the video game.

16. The system of claim 9 wherein the user may select how position information of other users affects a density of background characters present in the video game.

17. The system of claim 9 wherein the user may select how position information of other users affects a number of background characters present in the video game based on a number of other users within the predetermined distance.

18. A system to motivate a user to exercise harder comprising:
- a mobile device associated with a user; and
- an application stored in the mobile device, the application, when executed by the mobile device, providing:
  - a position tracking function operable to employ GPS features of the mobile device to track positions of the user of the mobile device;
  - a communication transmission function operable to employ communication facilities of the mobile device to communicate position information of the user of the mobile device to a server;
  - a communication reception function operable to employ the communication facilities of the mobile device to receive position information of other users from the server;
  - a monitor function operable to employ the position information of the other users from the server to identify other users within a predetermined distance of the user and operable to employ information from one or more sensors in communication with the user's mobile device to determine a level of exercise of the user; and
  - a video game executing on the mobile device, operable to employ the position information of the other users, wherein a game level of the video game is set based upon both the level of exercise of the user, and a number of other users identified within a predetermined distance of the user;
  - wherein setting the game level includes providing movement capabilities to a video game avatar of the user, wherein the movement capabilities of the user's video game avatar are improved for playing the video game; and
  - wherein the server may select one or more of how the position information of users affects the video game and the predetermined distance.

19. The system of claim 18 wherein the user may select how position information of other users affects a number of background characters present in the video game.

20. The system of claim 18 wherein the server may select how position information of other users affects a number of background characters present in the video game.

21. The system of claim 18 wherein a third party in communication with the server can set at least one of a value for the predetermined number of other users and the predetermined distance required before incentives are transmitted to the user.

* * * * *